(12) United States Patent
Adkins et al.

(10) Patent No.: US 7,440,966 B2
(45) Date of Patent: Oct. 21, 2008

(54) METHOD AND APPARATUS FOR FILE SYSTEM SNAPSHOT PERSISTENCE

(75) Inventors: Janet Elizabeth Adkins, Austin, TX (US); Joon Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/777,719

(22) Filed: Feb. 12, 2004

(65) Prior Publication Data

US 2005/0182797 A1 Aug. 18, 2005

(51) Int. Cl.
*G06F 7/00* (2006.01)

(52) U.S. Cl. ............... 707/102; 707/100; 707/104.1

(58) Field of Classification Search ........... 707/1–104.1
See application file for complete search history.

(56) References Cited

U.S. PATENT DOCUMENTS

| | | | | |
|---|---|---|---|---|
| 5,369,757 | A | | 11/1994 | Spiro et al. ............... 395/575 |
| 5,713,024 | A | | 1/1998 | Halladay ................... 395/712 |
| 5,819,292 | A | * | 10/1998 | Hitz et al. ................. 707/203 |
| 5,854,896 | A | | 12/1998 | Brenner et al. ......... 395/200.51 |
| 5,924,102 | A | | 7/1999 | Perks ...................... 707/200 |
| 5,978,565 | A | | 11/1999 | Ohran et al. ............ 395/182.11 |
| 6,038,639 | A | * | 3/2000 | O'Brien et al. ............. 711/114 |
| 6,108,749 | A | * | 8/2000 | White et al. ............... 711/112 |
| 6,205,527 | B1 | | 3/2001 | Goshey et al. ............. 711/162 |
| 6,205,558 | B1 | | 3/2001 | Sobel ........................ 714/15 |
| 6,477,629 | B1 | | 11/2002 | Goshey et al. ............. 711/162 |
| 6,490,690 | B1 | | 12/2002 | Gusler et al. ................ 714/4 |
| 6,496,944 | B1 | | 12/2002 | Hsiao et al. ................ 714/15 |
| 6,564,235 | B1 | | 5/2003 | Otsuka et al. ............. 707/204 |
| 6,584,583 | B2 | | 6/2003 | Nam ........................ 714/42 |
| 7,039,663 | B1 | * | 5/2006 | Federwisch et al. ....... 707/205 |
| 2003/0182389 | A1 | * | 9/2003 | Edwards ................... 709/213 |
| 2003/0191911 | A1 | * | 10/2003 | Kleinschnitz et al. ...... 711/154 |
| 2004/0103104 | A1 | * | 5/2004 | Hara et al. ................ 707/100 |
| 2004/0117572 | A1 | * | 6/2004 | Welsh et al. .............. 711/162 |
| 2005/0097260 | A1 | * | 5/2005 | McGovern et al. ......... 711/100 |

FOREIGN PATENT DOCUMENTS

WO WO 98/49626 11/1998

* cited by examiner

*Primary Examiner*—Don Wong
*Assistant Examiner*—Linh Black
(74) *Attorney, Agent, or Firm*—Duke W. Yee; Marilyn S. Dawkins; Gerald H. Glanzman (57) ABSTRACT

A method, apparatus, and computer instructions for managing data in a file system in a data processing system. A request to modify a data block in the file system is detected during file system recovery time. In response to detecting the request, metadata is written to describe the data block into a snapshot image. The data is copied for the data block in the file system to the snapshot image. The data block is modified in the file system after the data is copied into the snapshot image. The snapshot image may be used to return the file system to a state prior to modifying the data block in the file system.

23 Claims, 8 Drawing Sheets

METHOD AND APPARATUS FOR FILE SYSTEM SNAPSHOT PERSISTENCE

BACKGROUND OF THE INVENTION

1. Technical Field

The present invention relates generally to an improved data processing system and in particular, a method and apparatus for processing data. Still more particularly, the present invention provides a method, apparatus, and computer instructions for managing file systems.

2. Description of Related Art

A file system is a mechanism for storing and retrieving files on a disc. A file system defines the directory structure for keeping track of the files and the path syntax required to access the files. The file system also defines the way files are named, as well as, the maximum file size of the file or volume. A file system generally consists of two distinct parts, a collection of files and a directory structure. Each file in the collection of files stores related data. The directory structure organizes and provides information about the files in the file system.

Some concerns with respect to file systems relate to corruption and errors occurring in the file system. A file system snapshot is employed to establish a consistent block level image of the file system at a point in time. A block is a group of data that is transmitted or processed together at the same time. A block is also referred to as a data block. For example, a block may be one kilobyte in size. The snapshot of the file system is used for creating back-ups of the file system.

These snapshots are used for reconstructing a file system. Current snapshots are not persistent with respect to a crash of a data processing system. The present invention recognizes that currently available snapshot systems are not maintained during file system recovery operations. As a result, these types of snapshots are not persistent across a system reboot.

Therefore, it would be advantageous to have an improved method, apparatus, and computer instructions for creating and managing snapshots for a file system.

SUMMARY OF THE INVENTION

The present invention provides a method, apparatus, and computer instructions for managing data in a file system in a data processing system. A request to modify a data block in the file system is detected during file system recovery time. In response to detecting the request, metadata is written to describe the data block into a snapshot image. The data is copied for the data block in the file system to the snapshot image. The data block is modified in the file system after the data is copied into the snapshot image. The snapshot image may be used to return the file system to a state prior to modifying the data block in the file system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
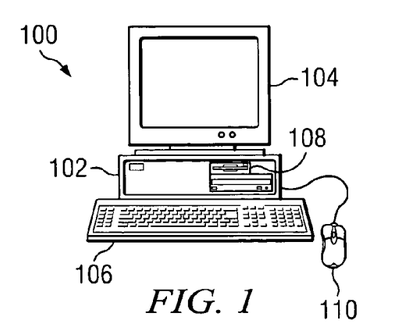
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
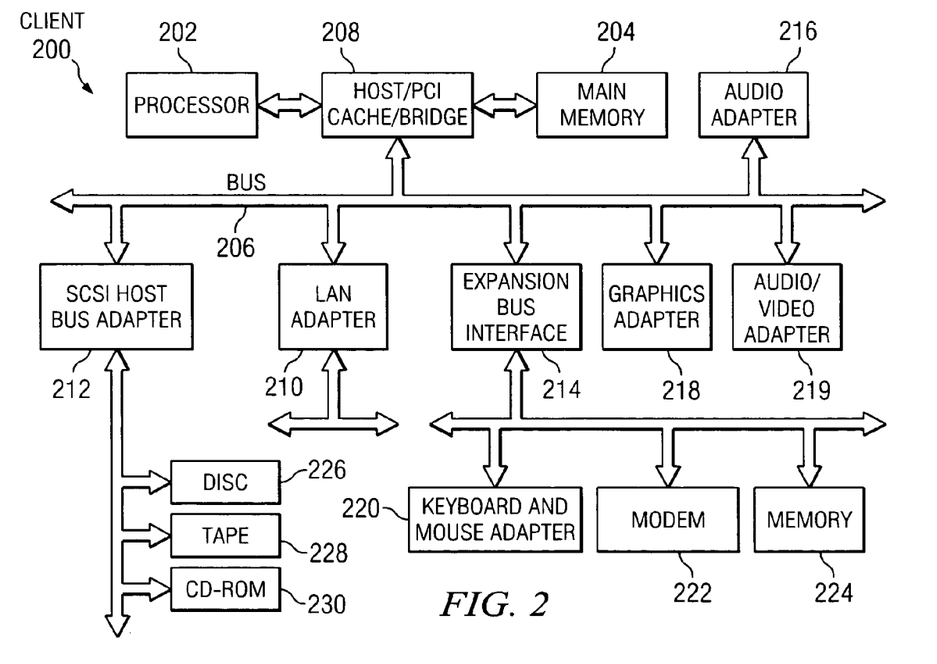
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disc drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disc drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disc drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disc drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
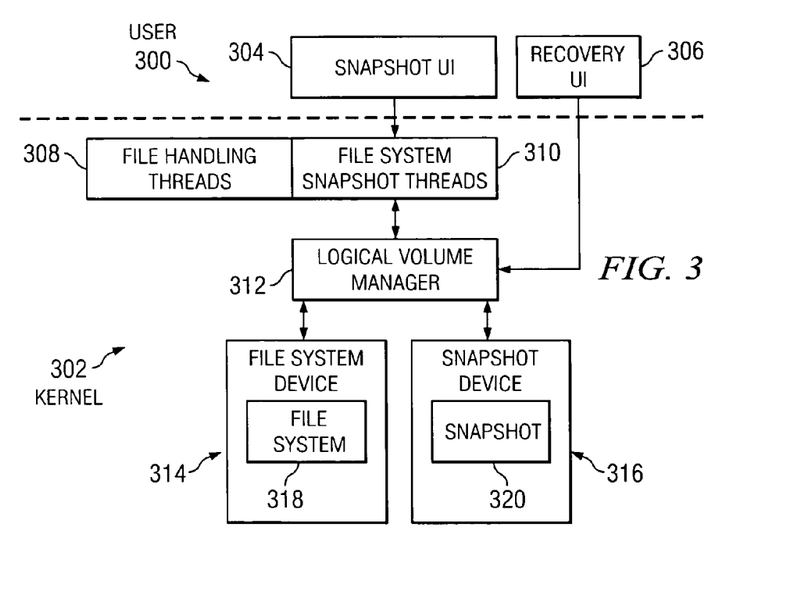
FIG. 3 is a diagram illustrating components used in creating and managing a snapshot of a file system in accordance with a preferred embodiment of the present invention.

Turning next to FIG. 3, a diagram illustrating components used in creating and managing a snapshot of a file system is depicted in accordance with a preferred embodiment of the present invention. As used herein, the term "snapshot" is used to refer to a snapshot of a file system and also may be called a "file system snapshot".

In this example, user space 300 and kernel space 302 are present. Snapshot user interface 304 and recovery user interface 306 are located in user space 300. These user interfaces are employed to receive user input to create snapshots, as well as, perform recovery processes in the event that the file system is to be restored to a prior state. In particular, snapshot user interface 304 is used to initiate creation of a snapshot. This interface is used to receive commands, such as a create or delete query. The use may be a person or an application. Recovery user interface 306 is used to initiate restoration of a file system after a system crash or power failure.

Kernel space 302 contains file handling threads 308, file system snapshot threads 310, logical volume manager 312, file system device 314, and snapshot device 316. File system 318 is located within file system device 314, while snapshot 320 is located within snapshot device 316. The two devices are logical volumes in these examples. File handling threads 308 are used for data access, such as a read operation, a write operation, or a mount drive operation. These operations are performed on data found in a file system, such as file system 318 in file system device 314. The processes for file handling threads 308 are employed when requests for data access are received during normal file system operations.

File system snapshot threads 310 are used to implement the processes for creating a snapshot, such as snapshot 320 located in snapshot device 316. This device may be found in various locations. For example, snapshot 320 may be located on the same physical hard drive as file system 318. Alternatively, snapshot 320 may be located on another storage media, such as a nonvolatile random access memory (NVRAM), another physical hard disc drive, or on an optical media. Logical volume manager 312 is used to provide an interface between file handling threads 308 and file system snapshot threads 310 and the logical devices, file system device 314 and snapshot device 316.

During runtime, snapshot metadata is constructed and written to snapshot 320 in a manner such that the state in snapshot 320 may be reconstructed in the event of a crash in the data processing system. In these illustrative examples, during file system recovery or repair, the reconstructed snapshot in snapshot device 320 is continuously updated by the recovery or repair process such that the state of the reconstructed snapshot at remount is consistent with the repaired file system state at the remount. After the file system recovery or repair operation completes, the snapshot will continue to contain the consistent block-level image of the file system of the point-in-time when the snapshot was created.

In particular, when data is to be modified in a file system, such as written to or deleted from file system 318, snapshot 320 is updated with the data from the file system. In these examples, a data block that is to be modified in file system 318 is copied into snapshot 320 before the data block is actually modified. In addition to the data from the data block, information, and meta data describe this data block before the modification is copied or written into snapshot 320. The metadata and the data created during runtime for the data block in snapshot 320 may be used to place file system 318 into a state prior to the modification of that data block.

Figure 4:
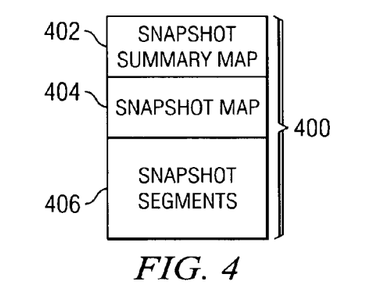
FIG. 4 is a diagram of a snapshot metadata in accordance with a preferred embodiment of the present invention.

Turning next to FIG. 4, a diagram of snapshot metadata is depicted in accordance with a preferred embodiment of the present invention. Snapshot metadata 400 is an example of a snapshot metadata for tracking file system blocks in a file system, such as snapshot 320 in FIG. 3. Snapshot metadata 400 is created through a snapshot process, such as file system snapshot threads 310 in FIG. 3. This snapshot, in the depicted examples of the present invention, is persistent across a system reboot of a data processing system. In these examples, persistence of a snapshot occurs when the snapshot image can be maintained by the file system recovery or repair operation.

In the illustrative examples, snapshot metadata 400 contains snapshot summary map 402, snapshot map 404, and snapshot segments 406. Entries within snapshot summary map 402 are used to describe snapshot map pages found in snapshot map 404. Each entry, in these examples, in snapshot summary map 402 describes the initialized state of a snapshot map group in snapshot map 404. A snapshot map group contains 32 snapshot map pages. Data within snapshot map 404 describes the in-use and copied state for every data block in the file system. Snapshot segments 406 contains before-image descriptors describing data blocks copied into snapshot segments 406, as well as, the data blocks from before the modification of the file system.

During runtime, on-disc structure states are preserved in snapshot metadata 400 when modifications to data blocks on the file system are to be made. These modifications include copy-on-write (COW) and copy-on-delete (COD) operations. The preservation of these states for data blocks allows for returning the file system to a state prior to the modification of the data block in the file system. A snapshot map group in snapshot map 404 is allocated and the in-use state of each snapshot map entry is initialized and synchronously written to the disc for every snapshot map group initialized in snapshot metadata 400. Summary snapshot map entries are synchronously initialized and updated during runtime.

Figure 5:
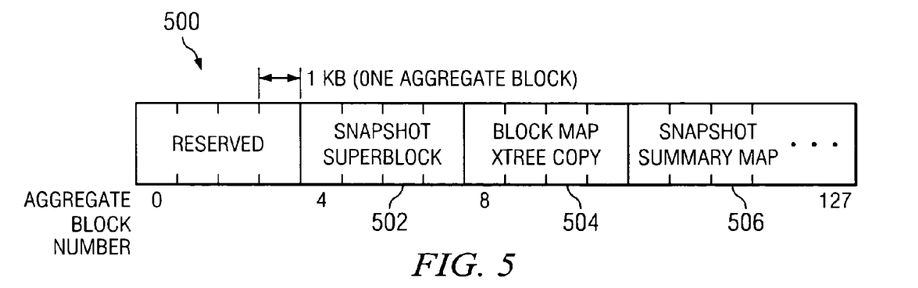
FIG. 5 is a diagram illustrating the beginning portion of a snapshot of a file system in accordance with a preferred embodiment of the present invention.

Turning now to FIG. 5, a diagram illustrating the beginning portion of a snapshot of a file system is depicted in accordance with a preferred embodiment of the present invention. Section 500 is a section on a hard disc drive containing snapshot superblock 502, block map Xtree copy 504, and snapshot summary map 506.

Snapshot summary map 506 is the beginning of a snapshot, such as snapshot metadata 400 in FIG. 4. Snapshot super block 502 identifies the beginning of the snapshot and points to the beginning and end of the snapshot segments in the snapshots which were written since the last mount of the file system. A file system is mounted when the file system is made available for access in a data processing system. Block map Xtree copy 504 contains a map of the file system structure describing the in-use state for the different blocks in a file system. Snapshot summary map 506 contains entries in which each entry points to the snapshot segment containing a snapshot map group and a summary of the in-use state for each snapshot map page in the snapshot map group that is initialized.

Figure 6:
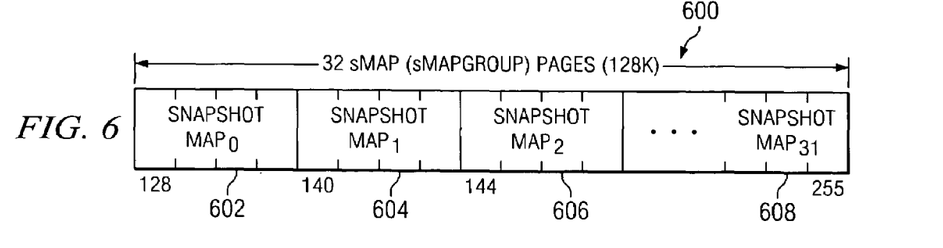
FIG. 6 is a diagram of a snapshot map group in a snapshot map in accordance with a preferred embodiment of the present invention.

With reference now to FIG. 6, a diagram of a snapshot map group in a snapshot map is depicted in accordance with a preferred embodiment of the present invention. Snapshot map group 600 is an example of pages located within a snapshot map, such as snapshot map 404 in FIG. 4. In these examples, snapshot map group 600 includes 32 pages although only 4 of those pages, snapshot map page 602, snapshot map page 604, snapshot map page 606, and snapshot map page 608 are shown in this figure. Each snapshot map page, in snapshot group 600 is initialized with the in-use state and synchronously written to disc for every file system block mapped by the page. The copied state of the file system blocks are asynchronously written to the snapshot map pages after the copy of the before-image of the file system block.

Figures 7, 8:
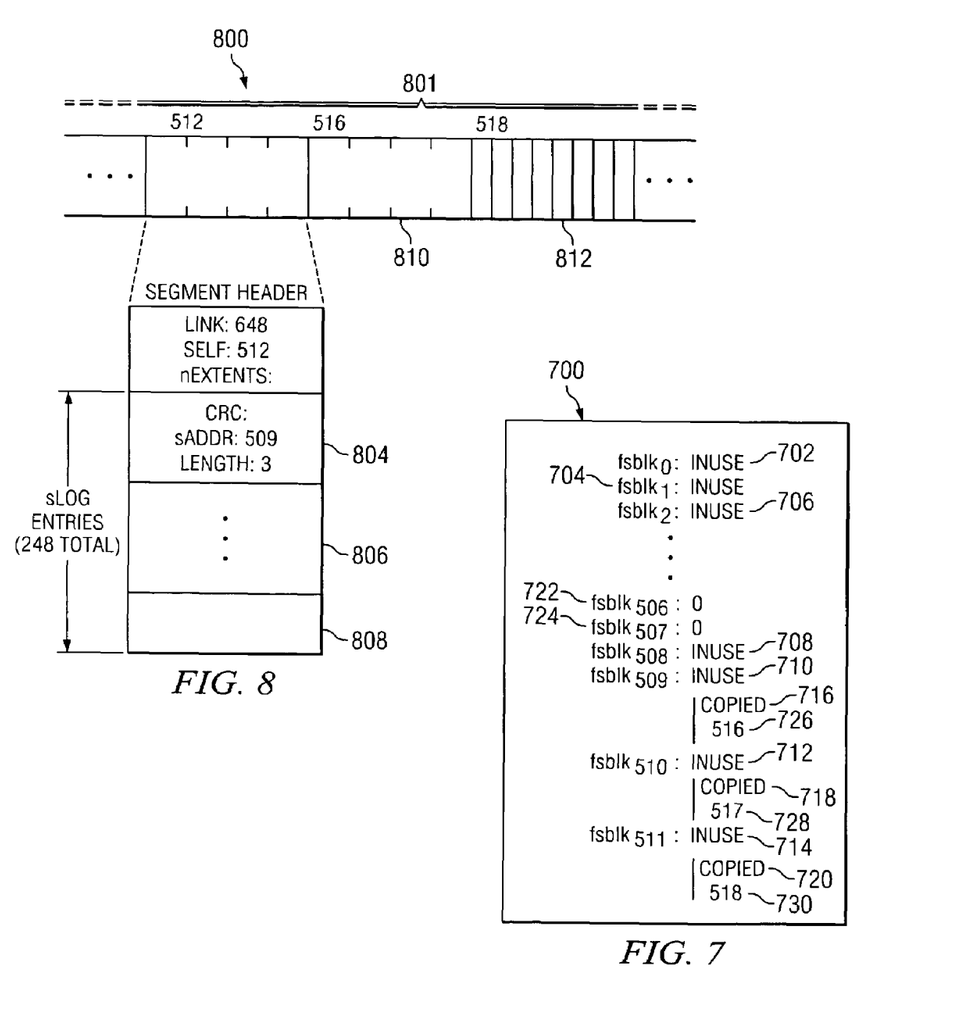
FIG. 7 is a diagram of a snapshot map page in a snapshot map group in accordance with a preferred embodiment of the present invention.
FIG. 8 is a diagram illustrating a segment in accordance with a preferred embodiment of the present invention.

Turning now to FIG. 7, a diagram of a snapshot map page in a snapshot map group is depicted in accordance with a preferred embodiment of the present invention. Snapshot map page 700 is an example of a snapshot map page, such as snapshot map page 602 in FIG. 6. This page or entry contains a description of the in-use state of every data block associated with the particular page in the snapshot segments. For example, entries 702, 704, 706, 708, 710, 712, and 714 describe the file system data blocks as being in use. This example indicates file system blocks 0, 1, 2, 508, 509, 510, and 511 were in-use in the file system when the snapshot was created. Entries 716, 718, and 720 show file system blocks as being copied. This example indicates file system blocks 509, 510, and 511 have had their before-images copied into the snapshot. Entries 726, 728, and 730 show the location in the snapshot where the before-images for the file system blocks have been copied. This example indicates the before-image of file system block 509 has been copied to snapshot block 516, the before-image of file system block 510 has been copied to snapshot block 517, and the before-image of file system block 511 has been copied to snapshot block 518. Entries 722 and 724 are shown as being neither in-use nor copied. In these examples, 512 entries are present in snapshot map page 700. Only a few entries actually present in snapshot map page 700 are shown for purposes of illustration.

Turning next to FIG. 8, a diagram illustrating a segment is depicted in accordance with a preferred embodiment of the present invention. Segment header 800 is an example of a segment header located in a snapshot segment, such as snapshot segments 406 in FIG. 4. In this example, segment header 800 is located in a page in segment 801, which in this example is 128 k bytes in size. Of course, any size segment may be used depending on the implementation.

Segment 801 contains segment header 800 which contains a link, a self value, and a number of extents, and 248 sLog entries. The link is the address to the next segment and the self value is the address of the current segment. The value for the number of extents identifies the number of extents that have been copied into the segment. An extent is a sequence of contiguous file system blocks allocated to a file system object as a unit. As illustrated, sLog entries 804, 806, and 808 are examples of header entries describing file system before-images which have been copied into the snapshot. Each sLog entry includes cyclic redundancy checking (CRC) data, a starting data block address, (sAddr), and a length that identifies the number of contiguous data blocks. Before-image file system data blocks are found in sections or extents 810 or 812 in this example. In this context, "before-image" means the file system block as it existed in the file system when the snapshot was created. The block image becomes the "before-image" when an attempt is made to modify the block image. The new block image could also be called the "after-image". The snapshot gets a copy of the before-image of the file system block and then the file system can write the after-image block to its device.

With respect to segments, such as segment 801, before-image data blocks are synchronously written into these segments. These segments are described in a linked list in a superblock, such as snapshot superblock 502 in FIG. 5. The header of the last segment in this link list is always initialized before the next-to-last segment header is written to point to this last segment. These segments also contain before-image descriptors which describe data blocks copied into the segment. In theses illustrative examples, a checksum field, such as a CRC data field, is used to verify the page-out of the last before-image extent when a crash occurs.

Figure 9A:
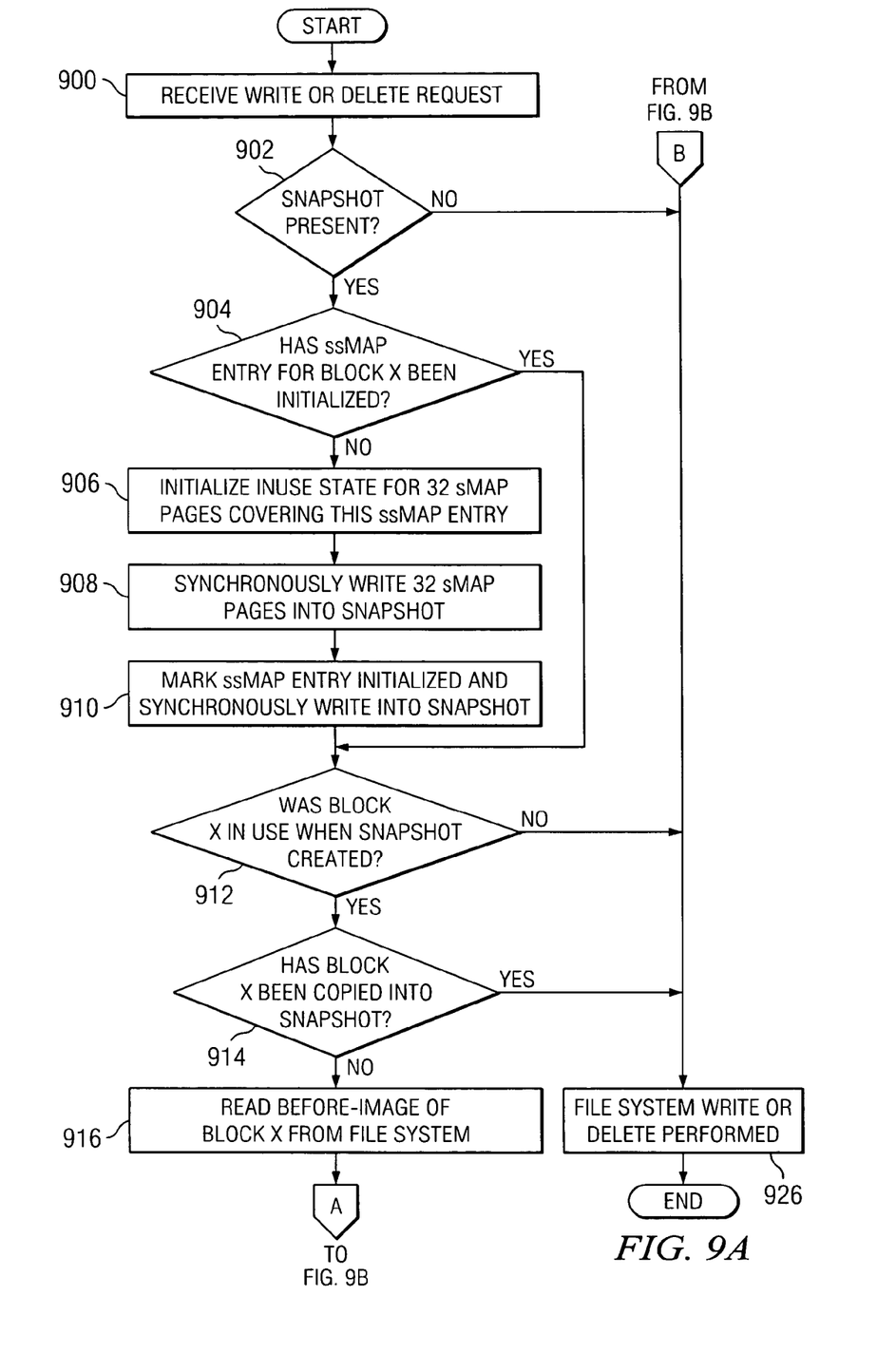
FIGS. 9A and 9B are flowcharts of a process for updating a snapshot of a file system in accordance with a preferred embodiment of the present invention.
Figure 9B:
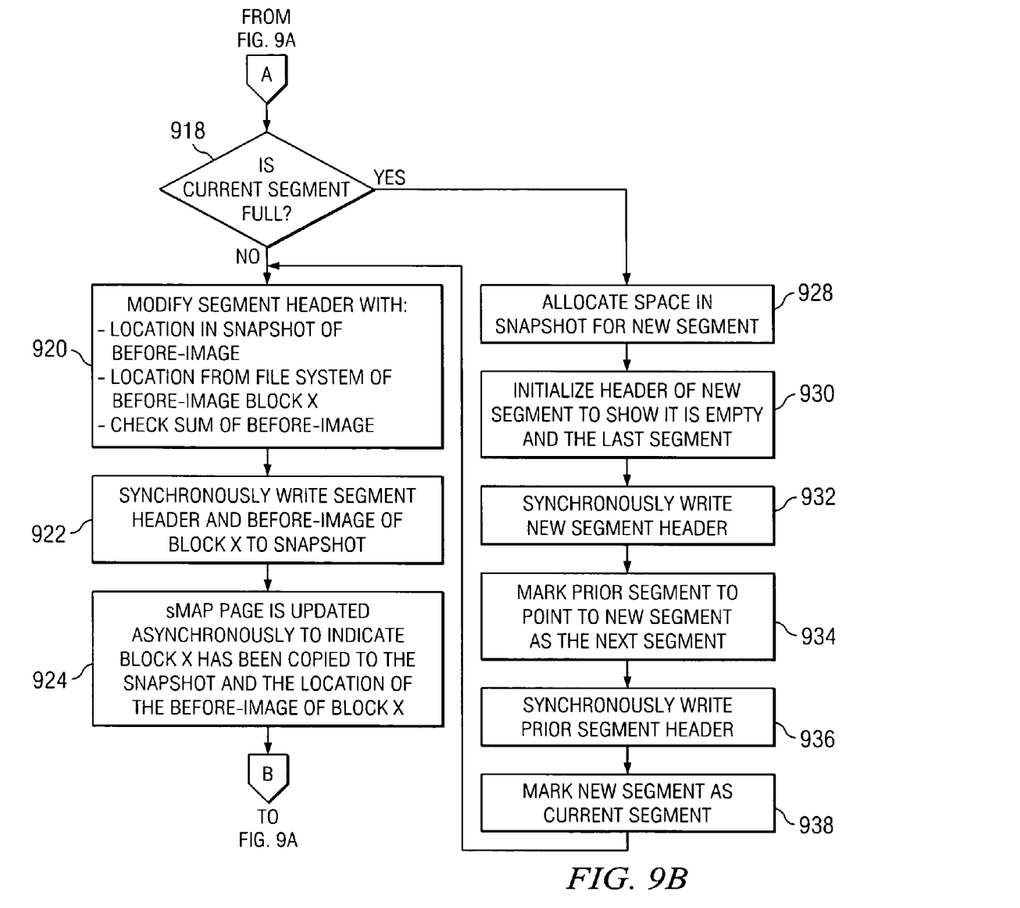

FIGS. 9A and 9B are flowcharts of a process for updating a snapshot of a file system is depicted in accordance with a preferred embodiment of the present invention. The process in FIGS. 9A and 9B may be implemented in a snapshot process, such as file system snapshot threads 310 in FIG. 3.

The process begins by receiving a request to modify data in a file system, such as a write or delete request (step 900). Next, a determination is made as to whether a snapshot of the file system is present (step 902). If a snapshot is present, a determination is made as to whether a snapshot summary map (ssMap) entry for block X has been initialized (step 904). In these examples, ssMap entries are found in a ssMap, such as snapshot summary map 402 in FIG. 4. Block X is for a data block that is to be modified in the file system. If the ssMap entry for block X has not been initialized, the in Use state is initialized for 32 sMap pages for this ssMap entry (step 906). These sMap pages may be, for example, pages in snapshot map group 600 in FIG. 6.

Thereafter, 32 snapshot map (sMap) pages are synchronously written into the snapshot (step 908). Next, the ssMap entry is marked initialized and the location of the sMapGroup is marked in the entry and synchronously written into the summary snapshot map in the snapshot (step 910).

Next, a determination is made as to whether block X was in use when the snapshot was created (step 912). If block X was in use in the file system when a snapshot was created, a determination is made as to whether block X has been copied into a snapshot (step 914). If block X has not been copied from the file system into the snapshot, the before-image of block X from the file system is read from the file system (step 916).

Thereafter, a determination is made as to whether the current segment in the snapshot is full (step 918). If the current segment is not full, then the current segment header is modified with the following: location in snapshot of before-image of block X, location of this data block in the file system, and checksum of before-image of block X (step 920). Next, the segment header and before-image of block X is synchronously written to the snapshot (step 922). In other words, the data for the data block, read from the file system before modification of the data block in the file system, is written into the snapshot. Thereafter, the sMap page is updated asynchronously to indicate block X has been copied to the snapshot and the location of the before-image of block X (step 924). This snapshot map page may be, for example, snapshot map page 602 in FIG. 6. Next, a file system modification, such as a file system write or delete operation, is performed (step 926), with the process terminating thereafter.

Returning to step 902, if a snapshot is not present, the process then proceeds to step 926, as described above. Next, referring back to step 904, if an ssMap entry for block X has been initialized, then the process proceeds directly to step 912 as described above. In step 912, if block X was not in use when the snapshot was created, the process proceeds to step 926 as described above. Turning back to step 914, if block X has been copied into the snapshot, then the process also proceeds to step 926 as described above.

Referring back to step 918, if the current segment is full, the space is allocated in the snapshot for a new segment (step 928). Next, the header of the new segment is initialized to show that the new segment is empty and is now the last segment in the snapshot (step 930). Then, the new segment header is synchronously written (step 932). Furthermore, the prior segment is marked to point to the new segment as the next segment (step 934). Next, the prior segment header is synchronously written (step 936). These segment headers are written synchronously and in this particular order to ensure against a system crash occurring before they are both written to disc. The file system recovery process depends on being able to determine the last written segment in the list. Then, the new segment is marked as the current segment (step 938). The process then proceeds to step 920 as described above.

The flowcharts with respect to the figures in FIGS. 10-13 describe a recovery process for returning a file system to a consistent state. The mechanism of the present invention provides a method for preserving the snapshot when a recovery or repair of the file system occurs.

The copied state of summary map pages are reconstructed by walking a linked list of before-image data segments to find the file system blocks, which have been copied into the snapshot. Additionally, the processes described below perform copy-on-write and copy-on-delete processing for any write or deletion of a file system data block through the recovery or repair process. After a system crash or power-down without an unmount of the file system, the file system metadata could be in an inconsistent state. For example, some blocks may have been flushed to disc while others have not been flushed to the disc. The recovery/repair process (fsck code or logredo) is used to return the file system metadata to a consistent state. This state is not necessarily the same state as the current snapshot. The kernel-side code does not handle a file system in an inconsistent state, so the file system must be repaired before it can be mounted again. Further, the processes described below maintain on-disc structure states for runtime to allow for continuation of recovery or repair if interrupted.

Figure 10:
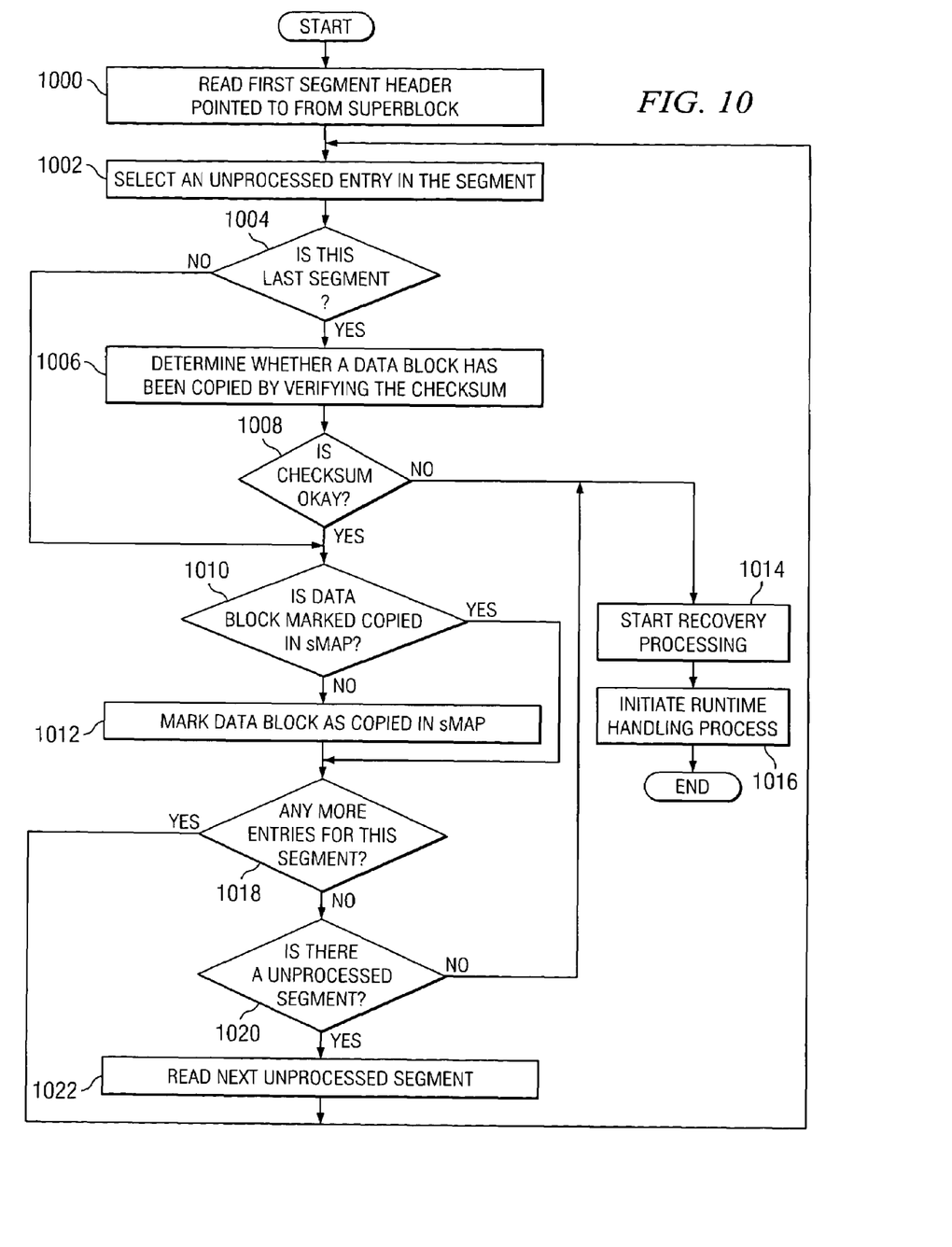
FIG. 10 is a process for initiating a recovery procedure in accordance with a preferred embodiment of the present invention.

FIG. 10 is a process for initiating a recovery procedure is depicted in accordance with a preferred embodiment of the present invention. The process in FIG. 10 may be implemented in a process, such as recovery UI 306 in FIG. 3.

The process begins by reading the first segment header pointed to from a superblock (step 1000). This superblock is, for example, snapshot superblock 502 in FIG. 5. Next, an unprocessed sLog entry in the segment is selected (step 1002). The entry is equivalent to the sLog entry as described in FIG. 8. Then, a determination is made as to whether this selected segment is the last segment in the snapshot segment list (step 1004). If this is the last segment, then a determination is made as to whether a data block has been copied by verifying a checksum (step 1006). Step 1006 is employed to determine if the before-image was completely written to disc before the system halted. For example, if a data block from a file system has not been copied to the snapshot, but the metadata for the data block has been written into the snapshot and the system crashes, the checksum will not match. In this case, the data block has not been copied into the snapshot, but the data block is intact on the file system because in this case, the data block has not been modified on the file system. This check is only necessary on the last segment due to the synchronous writing of the segment headers.

Next, a determination is made as to whether the checksum in the entry is okay (step 1008). If the checksum is okay, then a determination is made as to whether the data block is marked copied in the sMap (step 1010). If the data block is not currently marked as copied in the sMap, then the data block is now marked as copied in the sMap (step 1012).

Furthermore, a determination is made as to whether any additional entries are present for this segment (step 1018). If additional entries are not present for this segment, then a determination is made as to whether another unprocessed segment is present (step 1020). If another unprocessed segment is present, then the next unprocessed segment is read (step 1022). The process then proceeds to step 1002 as described above. Referring back to step 1018, if there are more unprocessed entries for the segment, then the process also proceeds to step 1002 as described above.

Referring back to step 1020, if another unprocessed segment is not present, then the recovery processing is started (step 1014). Next, the runtime handling process is initiated (step 1016), with the process terminating thereafter. Step 1014 is the same as step 1208 in FIG. 12 or step 1306 in FIG. 13. Step 1016 is the same as step 1214 in FIG. 12 or step 1312 in FIG. 13.

Referring back to step 1004, if this is not the last segment, then the process proceeds to step 1010 as described above. Turning back to step 1008, if the checksum is not okay, then the process proceeds to step 1014 as described above. In step 1010, if the block is marked copied in sMap, then the process proceeds to step 1018 as described above.

Figure 11:
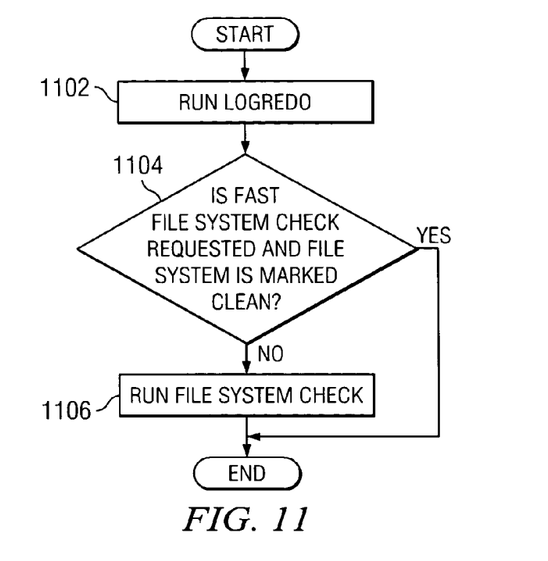
FIG. 11 is a process for checking the file system in accordance with a preferred embodiment of the present invention.

Turning next to FIG. 11, a process for checking the file system is depicted in accordance with a preferred embodiment of the present invention. The process in FIG. 11 may be implemented into a recovery UI, such as recovery UI 306 in FIG. 3. This process illustrates the flow when a file system recovery such as fsck code is initiated.

The process begins by running a logredo (step 1102). The steps performed for logredo are described in more detail below in FIG. 13. Next, a determination is made as to whether a fast file system check is requested and file system is marked clean (step 1104). The file system superblock is checked to determine if the file system is clean. The state will be marked dirty if logredo was unable to repair the file system. If the fast file system check is not requested or marked clean, then a file system check is ran (step 1106), with the process terminating thereafter. The file system check steps are described in more detail in FIG. 12 below. Referring back to step 1104, if the fast file system check is requested and file system is marked clean, then the process terminates thereafter.

Figure 12:
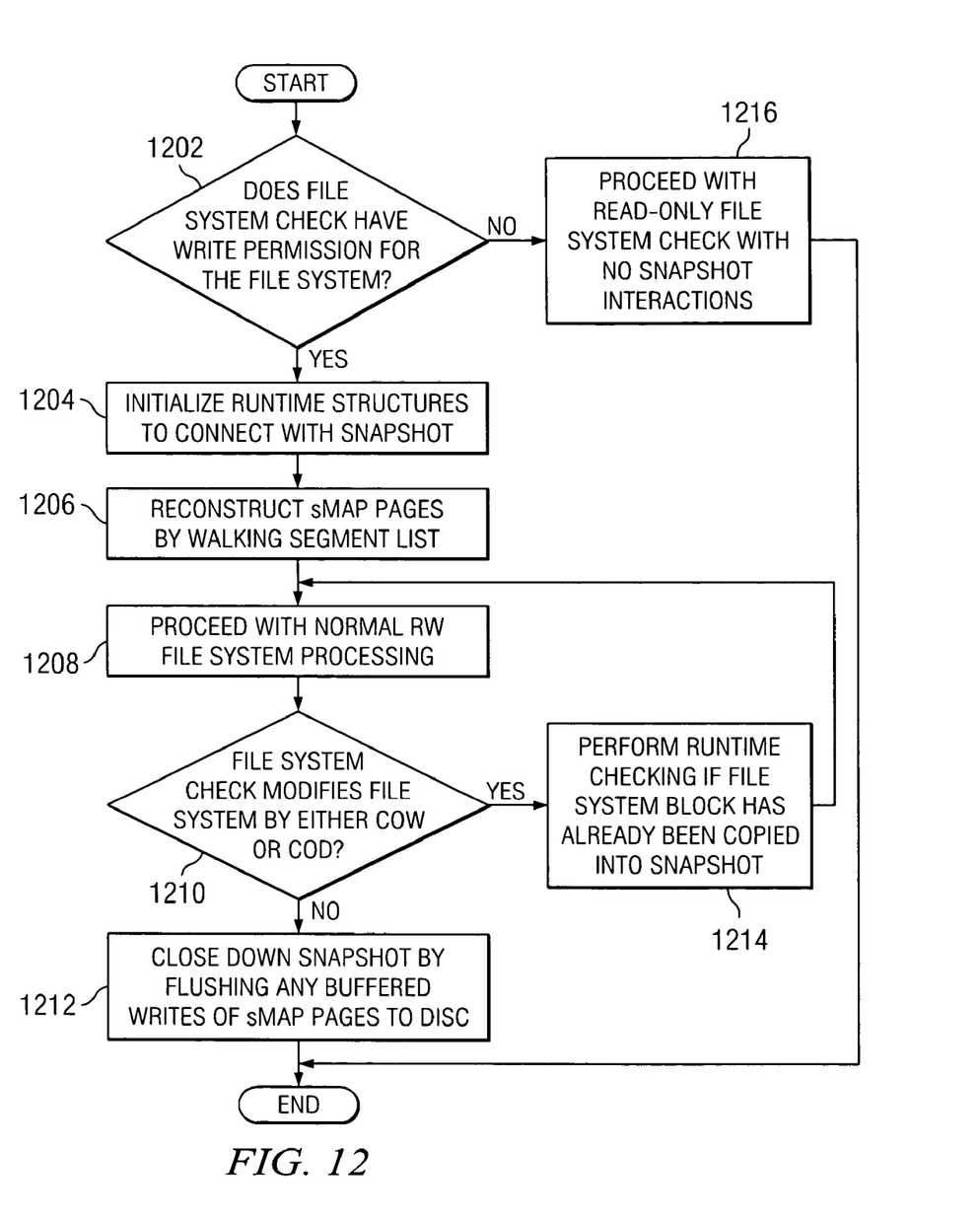
FIG. 12 is a process for performing a file system check recovery process for a file system in accordance with a preferred embodiment of the present invention.

In FIG. 12 a process for performing a file system check recovery process for a file system is depicted in accordance with a preferred embodiment of the present invention. A file system check recovery process is a method of verifying and repairing the file system metadata to be consistent by looking at all of the file system metadata. This process is also referred to as fsck. The process in FIG. 12 may be implemented into a recovery UI, such as recovery UI 306 in FIG. 3.

The process begins by a determination being made as to whether a file system check has written permission for the file system (step 1202). If the file system check has write permission for the file system, then the runtime structures are initialized to connect with a snapshot (step 1204). The runtime structures are the buffers used to hold the data to be written into the snapshot during the recovery operation.

Next, sMap pages are reconstructed by walking a segment list (step 1206). Step 1206 is described in more detail with respect to steps 1000-1014 and 1018-1022 in FIG. 10. The sMap pages are recovered because the sMap pages themselves were written asynchronously during runtime. The sMap pages do not necessarily have the correct copied state for the file system blocks. Thereafter, normal read/write (rw) file system processing proceeds (step 1208). During step 1208 the fsck code looks at all of the file system metadata and determines if any inconsistencies are present in the file system metadata. If the fsck code finds any inconsistencies then the fsck code determines how to repair the file system metadata. The fsck code can either remove the file system object or attempt to repair the file system object's metadata. A removal would result in a COD and a repair would result in a COW.

Then, a determination is made as to whether the file system check modifies the file system by either a copy-on-write (COW) operation or a copy-on-delete (COD) operation (step 1210). If the file system check does not modify the file system by either a COW operation or a COD operation, then the snapshot is closed down by flushing any buffered writes of sMap pages to disc (step 1212), with the process terminating thereafter.

Referring back to step 1202, if the file system check does not have write permission for the file system, then proceed with read-only file system check with no snapshot interactions (step 1216) with the process terminating thereafter. During a read-only check, fsck code looks at all of the file system metadata and issues warning messages if any inconsistencies are found. It makes no modifications to the file system. Returning to step 1210, if the file system check does modify the file system by either a COW operation or a COD operation, then runtime checking is performed if file system block has already been copied into snapshot (step 1214) with the process then proceeding to step 1208 as described above. This checking is done in the same manner as described for FIGS. 9A and 9B. It is done under the same process as the fsck code process currently being run in recovery UI 306 in FIG. 3.

Figure 13:
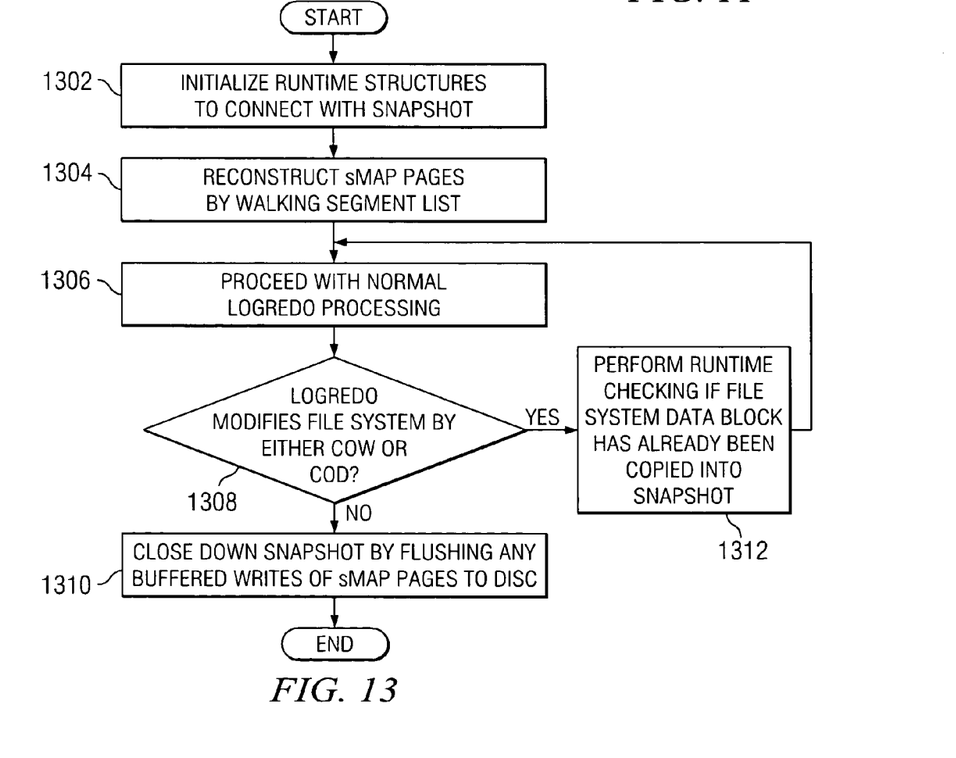
FIG. 13 is a process for performing a logredo recovery process for a file system journaled log in accordance with a preferred embodiment of the present invention.

Turning next to FIG. 13, a process for performing a logredo recovery process for a file system journaled log is depicted in accordance with a preferred embodiment of the present invention. The process in FIG. 13 may be implemented into a recovery UI, such as recovery UI 306 in FIG. 3.

The process begins by initializing runtime structures to connect with a snapshot (step 1302). Next, sMap pages are reconstructed by walking a segment list (step 1304). Step 1304 is described in more detail with respect to steps 1000-1014 and 1018-1022 in FIG. 10. Thereafter, proceed with normal logredo processing (step 1306). The journal log associated with the file system is read. A file system uses database journaling techniques to maintain structural consistency of a file system by tracking changes to the file system metadata in the journal log. The log records are replayed. Each log record contains information about a change to the file system metadata. By replaying the log record the file system metadata is modified according to the log record. All log records starting at the end of the log and moving backwards are replayed up to the last sync point. Next, a determination is made as to whether logredo modifies file system by either a COW operation or a COD operation (step 1308). If logredo does not modify the file system by either a COW operation or a COD operation then the snapshot is closed down by flushing any buffered writes of sMap pages to disc (step 1310), with the process terminating thereafter.

Referring back to step 1308, if logredo modifies file system by either a COW operation or a COD operation, then runtime checking is performed to determine whether the file system data block has already been copied into the snapshot (step 1312). Similar to the fsck code figure, step 1312 is equivalent to the process previously described in FIGS. 9A and 9B. The process then proceeds to step 1306 as described above.

Thus, the present invention provides an improved method, apparatus, and computer instructions for recovering from system crashes and preserving the file system's snapshots created through the processes of the present invention. The mechanism of the present invention dynamically updates a snapshot of the file system. Metadata is included in the snapshot about data blocks that are subject to modifications in the file system. In these examples, the modifications are write and delete operations on the data blocks in the file system. The data block subject to such an operation is copied into the snapshot prior to the modification operation being performed on the data block in the file system. Additionally, data such as the location of the data block in the file system, prior to modification, and the location of the data block in the snapshot are included in the snapshot. The metadata about a data block is written into the snapshot before the data block is written into the snapshot. The data block written into the snapshot is for a "before image" of the data block as it existed in the file system when the snapshot is created. The modification of the data block in the file system occurs after writing of the metadata and the before-image of the data block into the snapshot. This modification results in the "after image" version of the data block. If it is desirable to restore the state of the file system to the state when the snapshot was created, the restoration can be made using the snapshot.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing data in a file system, the method comprising:
   detecting a request to modify a data block in the file system;
   responsive to detecting the request:
      writing metadata describing the data block in the file system into a snapshot image, wherein the snapshot image is updated to maintain a consistent block-level image of the file system from a point-in-time when the snapshot was created, and
      wherein the writing further comprises writing an in-use state of snapshot map entries for a snapshot map group to the snapshot image prior to any before-image data blocks referenced by the snapshot map group being written to the snapshot image; and
      copying data for the data block in the file system to the snapshot image to further update the snapshot image; and
   modifying the data block in the file system after copying of the data in the data block to the snapshot image has occurred, wherein the snapshot image is usable to return the file system to a state prior to modifying the data block in the file system.

2. The method of claim 1, wherein the copying step includes:
   storing an identification of information used to locate the data in a table within the snapshot image, wherein the table is used to locate different data blocks in the file system.

3. The method of claim 1, wherein the snapshot image includes a snapshot summary map, a snapshot map, and a set of segments and wherein the summary map identifies initialized states for snapshot map pages in the snapshot map, the snapshot map contains the snapshot map pages that identify data blocks in use in the file system, and the set of segments includes copies of data blocks from the file system.

4. The method of claim 1, wherein the metadata includes a snapshot summary map, a snapshot map, and segment headers and wherein the metadata of the snapshot image is used to reconstruct the state of the file system in response to a selected event.

5. The method of claim 4, wherein the selected event is a failure of the data processing system while modifying the data block in the file system.

6. The method of claim 4, wherein the selected event is a user input requesting restoration of the file system to a consistent state.

7. The method of claim 1, wherein the writing step further comprises:
   marking a summary snapshot map entry as being initialized and marking a location of the snapshot map group after writing the in-use state of data blocks for the snapshot map group to the snapshot image.

8. The method of claim 7, wherein the writing step further comprises:
   initializing a segment header of a new last segment in a list of segments before a prior segment is modified to point to the new last segment.

9. The method of claim 4, wherein the snapshot map contains snapshot map pages and wherein the snapshot map pages are reconstructed during a recovery operation.

10. The method of claim 9, wherein the recovery operation handles copying of before-images of data blocks in the file system that are to be modified by the recovery operation.

11. A data processing system for managing data in a file system, the data processing system comprising:
   detecting means for detecting a request to modify a data block in the file system;
   responsive to detecting the request:
      writing means for writing metadata describing the data block in the file system into a snapshot image, wherein the snapshot image is updated to maintain a consistent block-level image of the file system from a point-in-time when the snapshot was created, and
      wherein the writing further comprises writing an in-use state of snapshot map entries for a snapshot map group to the snapshot image prior to any before-image data blocks referenced by the snapshot map group being written to the snapshot image; and
   copying means for copying data for the data block in the file system to the snapshot image to further update the snapshot image; and
   modifying means for modifying the data block in the file system after copying of the data in the data block to the snapshot image has occurred, wherein the snapshot image is usable to return the file system to a state prior to modifying the data block in the file system.

12. The data processing system of claim 11, wherein the copying means includes:

storing means for storing an identification of information used to locate the data in a table within the snapshot image, wherein the table is used to locate different data blocks in the file system.

13. The data processing system of claim 11, wherein the snapshot image includes a snapshot summary map, a snapshot map, and a set of segments and wherein the summary map identifies initialized states for snapshot map pages in the snapshot map, the snapshot map contains the snapshot map pages that identify data blocks in use in the file system, and the set of segments includes copies of data blocks from the file system.

14. The data processing system of claim 11, wherein the metadata includes a snapshot summary map, a snapshot map, and segment headers and wherein the metadata of the snapshot image is used to reconstruct the state of the file system in response to a selected event.

15. The data processing system of claim 14, wherein the selected event is a failure of the data processing system while modifying the data block in the file system.

16. The data processing system of claim 14, wherein the selected event is a user input requesting restoration of the file system to a consistent state.

17. A computer program product in a computer readable medium for managing data in a file system in a data processing system, the computer program product comprising:
first instructions for detecting a request to modify a data block in the file system;
responsive to detecting the request:
second instructions for writing metadata describing the data block in the file system into a snapshot image, wherein the snapshot image is updated to maintain a consistent block-level image of the file system from a point-in-time when the snapshot was created, and wherein the writing further comprises writing an in-use state of snapshot map entries for a snapshot map group to the snapshot image prior to any before-image data blocks referenced by the snapshot map group being written to the snapshot image; and
third instructions for copying data for the data block in the file system to the snapshot image to further update the snapshot image; and
fourth instructions for modifying the data block in the file system after copying of the data in the data block to the snapshot image has occurred, wherein the snapshot image is usable to return the file system to a state prior to modifying the data block in the file system.

18. The computer program product of claim 17, wherein the third instructions includes:
sub-instructions for storing an identification of information used to locate the data in a table within the snapshot image, wherein the table is used to locate different data blocks in the file system.

19. The computer program product of claim 17, wherein the snapshot image includes a snapshot summary map, a snapshot map, and a set of segments, wherein the summary map identifies initialized states for snapshot map pages in the snapshot map, the snapshot map contains the snapshot map pages that identify data blocks in use in the file system or data blocks copied into the snapshot, and the set of segments includes copies of data blocks from the file system.

20. The computer program product of claim 17, wherein the metadata includes a snapshot summary map, a snapshot map, and segment headers and wherein the metadata of the snapshot image is used to reconstruct the state of the file system in response to a selected event.

21. The computer program product of claim 20, wherein the selected event is a failure of the data processing system while modifying the data block in the file system.

22. The computer program product of claim 20, wherein the selected event is a user input requesting restoration of the file system to a consistent state.

23. A data processing system comprising:
a bus system;
a memory connected to the bus system, wherein the memory includes a set of instructions; and a processing unit connected to the bus system, wherein the processing unit executes a set of instructions to detect a request to modify a data block in the file system; write metadata describing the data block in the file system into a snapshot image, in response to detecting the request, wherein the snapshot image is updated to maintain a consistent block-level image of the file system from a point-in-time when the snapshot was created; wherein the writing further comprises writing an in-use state of snapshot map entries for a snapshot map group to the snapshot image prior to any before-image data blocks referenced by the snapshot map group being written to the snapshot image; and copy data for the data block in the file system to the snapshot image to further update the snapshot image in response to detecting the request; and modify the data block in the file system after copying of the data in the data block to the snapshot image has occurred, wherein the snapshot image is usable to return the file system to a state prior to modifying the data block in the file system.

* * * * *